United States Patent
Hoshihara et al.

(10) Patent No.: US 10,235,117 B2
(45) Date of Patent: Mar. 19, 2019

(54) DISPLAY CONTROL SYSTEM

(71) Applicant: MITSUBISHI ELECTRIC CORPORATION, Tokyo (JP)

(72) Inventors: Yasunori Hoshihara, Tokyo (JP); Yoshihiko Mori, Tokyo (JP); Takeshi Mitsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 47 days.

(21) Appl. No.: 14/434,695

(22) PCT Filed: Jan. 31, 2013

(86) PCT No.: PCT/JP2013/052216
§ 371 (c)(1),
(2) Date: Apr. 9, 2015

(87) PCT Pub. No.: WO2014/118943
PCT Pub. Date: Aug. 7, 2014

(65) Prior Publication Data
US 2015/0254041 A1    Sep. 10, 2015

(51) Int. Cl.
*G06F 3/041*    (2006.01)
*G06F 3/14*    (2006.01)
(Continued)

(52) U.S. Cl.
CPC ............... *G06F 3/14* (2013.01); *B60K 35/00* (2013.01); *B60K 37/06* (2013.01); *G06F 3/0488* (2013.01);
(Continued)

(58) Field of Classification Search
None
See application file for complete search history.

(56) References Cited

U.S. PATENT DOCUMENTS 7,338,443 B1 *   3/2008   Tucker ................. G06F 19/327
                                                  600/300
8,587,546 B1 *  11/2013   El-Khoury ........... G06F 3/1431
                                                  345/173
(Continued)

FOREIGN PATENT DOCUMENTS

DE    102006028046 A1    12/2007
DE    102009049110 A1     4/2011
(Continued)

*Primary Examiner* — Jennifer Mehmood
*Assistant Examiner* — Parul H Gupta
(74) *Attorney, Agent, or Firm* — Birch, Stewart, Kolasch & Birch, LLP

(57) ABSTRACT

Among screen data in which screens for displaying sets of application information generated by a plurality of application units (30-60) in a normal display form are drawn and screen data in which screens for displaying the sets of application information in a simplified display form are drawn, screen data with the screen for normal display is selected for the application data matched to an intended-use of each display device, and screen data with the screen for simplified display is selected for the application data unmatched to the intended use of each display device, to thereby generate based on these selected screen data, display-screen data for each display device.

9 Claims, 11 Drawing Sheets

(51) Int. Cl.
  *B60K 35/00* (2006.01)
  *G09G 5/00* (2006.01)
  *G09G 5/14* (2006.01)
  *G06F 3/0488* (2013.01)
  *B60K 37/06* (2006.01)

(52) U.S. Cl.
  CPC ............ *G06F 3/1423* (2013.01); *G09G 5/00* (2013.01); *G09G 5/14* (2013.01); *B60K 2350/1004* (2013.01); *B60K 2350/1028* (2013.01); *B60K 2350/1072* (2013.01); *B60K 2350/1096* (2013.01); *B60K 2350/352* (2013.01); *B60K 2350/403* (2013.01); *G09G 2380/10* (2013.01)

(56) References Cited

U.S. PATENT DOCUMENTS

2003/0184561 A1  10/2003  Vorst
2007/0233378 A1* 10/2007  Tanaka ............... G01C 21/3664
                                                        701/456
2007/0294073 A1* 12/2007  Okamoto ............... B60K 35/00
                                                         703/20
2008/0309474 A1  12/2008  Okamoto et al.
2009/0102632 A1   4/2009  Kobayashi et al.
2009/0102798 A1*  4/2009  Fujita .................... H04L 65/602
                                                         345/168
2009/0135199 A1   5/2009  Okamoto
2009/0179745 A1   7/2009  Okamoto et al.

FOREIGN PATENT DOCUMENTS

| | | |
|---|---|---|
| JP | 2007-269113 A | 10/2007 |
| JP | 2008-239145 A | 10/2008 |
| JP | 2010-126147 A | 6/2010 |
| WO | WO 03/022618 A1 | 3/2003 |
| WO | WO 2006/022228 A1 | 3/2006 |
| WO | WO 2007/032139 A1 | 3/2007 |
| WO | WO 2007/122763 A1 | 11/2007 |

\* cited by examiner

FIG.6

Two-Byte Data String

| | |
|---|---|
| 0 | Communication Command type (Application-Screen Display Information) |
| 2 | Communication Data Size (Byte) |
| 4 | Address of Communication-Destination Microcomputer (Image Integration Control microcomputer) |
| 6 | Address of Communication-Source Microcomputer (Microcomputer Dedicated for Each Application) |
| 8 | Total Screen Size <br> Number of Vertical Pixels \| Number of Lateral Pixels |
| 10 | Number of Internal Display Screens |
| 12 | Internal Display Screen 1 - Type/ID <br> Type \| ID |
| 14 | Internal Display Screen 1 - Size <br> Number of Vertical Pixels \| Number of Lateral Pixels |
| 16 | Internal Display Screen 1 - Display Position (Top-Left Corner: Origin Coordinate) <br> Vertical Pixel Position \| Lateral Pixel Position |
| 18 | Internal Display Screen 1 - Display Content |
| 20 | Internal Display Screen 2 - Type/ID <br> Type \| ID |
| 22 | Internal Display Screen 2 - Size <br> Number of Vertical Pixels \| Number of Lateral Pixels |
| 24 | Internal Display Screen 2 - Display Position (Top-Left Corner: Origin Coordinate) <br> Vertical Pixel Position \| Lateral Pixel Position |
| 25 | Internal Display Screen 2 - Display Content |
| | ⋮ <br> (Varies Depending on Number of Internal Screens) |

|  | Meter Application | Car Navigation Application | AV Application | Sensor Application |
|---|---|---|---|---|
| Display Device 20 | ○ | × | × | × |
| Display Device 21 | × | ○ | ○ | ○ |

FIG.9

Two-Byte Data String

| 0 | Communication Command type (Display Information for Display Device) ||
|---|---|---|
| 2 | Communication Data Size (Byte) ||
| 4 | Address of Communication-Destination Microcomputer (Microcomputer Dedicated For Each Application) ||
| 6 | Address of Communication-Source Microcomputer (Image Integration Control microcomputer) ||
| 8 | Number of Screens Outputted by Each Application ||
| 10 | Display Device Number/Application Internal Display Screen ID ||
| | Display Device number | ID |
| 12 | Screen Display Size on Display Device ||
| | Number of Vertical Pixels | Number of Lateral Pixels |
| 14 | Display Position on Display Device (Bottom-Left Corner: Origin Coordinate) ||
| | Vertical Pixel Position | Lateral Pixel Position |
| 16 | Display Device Number/Application Internal Display Screen ID ||
| | Display Device number | ID |
| 18 | Screen Display Size on Display Device ||
| | Number of Vertical Pixels | Number of Lateral Pixels |
| 20 | Display Position on Display Device (Bottom-Left Corner: Origin Coordinate) ||
| | Vertical Pixel Position | Lateral Pixel Position |
| | ⋮ ||
| | (Varies Depending on Number of Internal Screens) ||

DISPLAY CONTROL SYSTEM

TECHNICAL FIELD

The present invention relates to a display control system having a plurality of display devices, which uses individual screen data generated by a plurality of application units to thereby generate screen data with a screen layout corresponding to each of the plurality of display devices to be displayed thereon.

BACKGROUND ART

With respect to in-vehicle systems, there has been enhanced an equipment rate in vehicles of in-vehicle information devices such as car navigations, TV tuners, media players and the like. Also, in recent years, diversifications have been made in various applications for safety and security that use a kind of sensor such as a camera, an electric-wave radar or the like, so that necessary information for a driver and a fellow passenger is presented to them through a display device of the in-vehicle information device by cooperating such an application and the in-vehicle information device.

Further, since a wide variety of information becomes obtainable in association with progress of in-vehicle network technology, vehicle information can be acquired that includes information from the in-vehicle information device, in addition to basic information having conventionally been displayed in a form of vehicle meter, such as a vehicle speed, an engine revolution number, a shift state, a fuel residual amount and the like. Furthermore, with respect also to the display devices themselves, not only conventional warning indicators based on mechanical meters and LED lightings but also in-vehicle display devices using fluorescent display tubes or LED panels, have become popular. Thus, by combining them to construct an information presentation system, it is able to also display other information than the basic vehicle information. As just described, diversifications have been made also in meter display apparatuses for presentation to the driver.

In the conventional meter display apparatuses, an application for meter display generates display-screen data to thereby display it on a display device dedicated for meter display. Meanwhile, in the in-vehicle information devices, a plurality of applications individually generate respective display-screen data and any one of these data is displayed in a replaceable manner when specified through an operation by the driver or a fellow passenger or depending on the fact as a trigger that predetermined vehicle information is acquired. in this manner, conventionally, respective displays by the meter display apparatus and the in-vehicle information device are usually independent to each other.

However, in recent years, in order to diversify the presentable information to the driver and a fellow passenger, there are proposed display systems each capable of mutually replacing/combining the meter display and the display by the in-vehicle information device.

For example, in Patent Document 1, there is disclosed a display control apparatus that applies image processing, respectively, on display data for the meter generated by a graphic display controller (GDC) for a vehicle system, display data for a car navigation, a DVD playback, a TV, an audio application and the like generated by a GDC for an amenity system, and display data of a variety of sensors generated by a GDC for a safety system, to thereby display them on an LCD panel mounted in an instrument panel (hereinafter, abbreviated as "IN-PANE").

Note that, in the display control apparatus described in Patent Document 1, the meter display data is generated by controlling the GDC using vehicle information from a powertrain-system electronic control unit (ECU) and a body-system ECU that are connected to an in-vehicle local area network (LAN). Further, image-output control data such as sizes of respective images in a meter-display screen and a screen layout thereof are transmitted from a processor mounted in the vehicle system through an in-vehicle LAN of another line than that of the ECUs. Other than this, with respect also to the amenity system and the safety system, image-output control data for the display screen generated by their respective GDCs are transmitted similarly from the processor in the amenity system and the processor in the safety system though the same in-vehicle LAN.

A micro-controller for a display platform (DPF) in the display control apparatus in Patent Document 1 evaluates the respective image-output control data and the state of the vehicle that are received through the in-vehicle LANs, to thereby respectively and properly locate the display data generated by the GDCs of the respective systems on the LCD panel of the instrument panel. In such a manner, by generating the display data for image display in a shared manner by the processors in the respective systems, the stability of screen display is improved.

Meanwhile, in Patent Document 2, there is disclosed a display system that is mounted in a drivable moving object to thereby display plural sets of information including information of the moving object, individually in the screens corresponding to the respective sets of information and provided on a plurality of display panels. In this display system, the display panels are each capable of displaying at least one screen, and there are included display screen control sections provided for the respective display panels so as to generate the display data for said at least one screen in each of the display panels, and a single display selecting section that selects the screen to be displayed on each of the display panels on the basis of the plural sets of information including information of the moving object.

Namely, in the display system in Patent Document 2, there are included a plurality of blocks each equivalent to the display control apparatus in Patent Document 1, and for example, at the front seat or rear seat side in the vehicle, each display data generated by the processors of the respective systems is displayed on each display device.

However, when the same information is to be displayed respectively on a plurality of display devices mounted in the vehicle, in many cases, this information is adequate to be displayed in each display form (display content or display method) suited to each user watching the display device.

Further, since the display form suited to the user watching the display device possibly changes depending also on a vehicle traveling condition, there may be also cases, depending on a state of that change, where the user's visibility is deteriorated, resulting in a bothersome display.

CITATION LIST

Patent Document

Patent Document 1: Japanese Patent Application Laid-open No.2008-239145
Patent Document 2: International Patent Application Publication No. 2007/122763

SUMMARY OF THE INVENTION

Problems to be Solved by the Invention

In the conventional arts represented by Patent Documents 1, 2, information necessary for the driver and a fellow passenger is presented to them by combining the respective display data generated by the applications of the respective systems according to the vehicle traveling condition, etc.

However, according to the conventional arts, there is a problem that the information is not presented in a display form well-suited to a target person viewing the display device.

For example, in a vehicle provided with a meter display device that is placed in the instrument panel and a display device that is placed at the center of the front side of the front seat, a car navigation screen in which route-guide information is overlapped on a map screen is displayed usually on the display device placed at the center of the front side of the front seat. That is, since it is required during traveling of the vehicle to focus on its driving, a position of the host vehicle and its traveling route are confirmed by the fellow passenger on the assistant driver's seat, or by the driver when instead the vehicle is stopping, by watching the display device placed at the center of the front side of the front seat.

Meanwhile, even during traveling of the vehicle, there are cases where the driver wants to confirm the route-guide information. In those cases, as viewed from the driver, a movement of his/her eyes is smaller thus making it possible to reduce its influence on the driving, when the route-guide information is displayed on the display device placed in the instrument panel than when displayed on the display device placed at the center of the front side of the front seat.

The display device placed in the instrument panel is required, since its target user is the driver, to present a content of meter-display to the driver during traveling of the vehicle, so that when a car navigation screen is to be displayed thereon, it is necessary to be located in an empty area other than an area for the meter display. Thus, in Patent Documents 1, 2, a map screen for car navigation is displayed as a small screen.

However, merely converting the car navigation screen into a small screen would rather deteriorate the visibility, thus causing a possibility that the driver focuses too much on watching the small screen to get distracted from driving. In this case, in order that the driver can watch instantly, it is better that the route-guide information be displayed in a simplified manner.

Note that if the vehicle is stopping, since it is not required to present a display of the meter such as a vehicle speed etc. , to the driver, it is possible to display a car navigation screen also in the area in which the meter is to be displayed during traveling of the vehicle, and also possible for the driver to perform a car navigation operation on the basis of that screen. In this case, displaying the car navigation screen in a simplified manner deteriorates the operability, and thus displaying it as a normal full-screen is preferable.

Meanwhile, as viewed from the fellow passenger on the assistant driver's seat, it is easier to watch the meter information indicative of a vehicle traveling condition such as a vehicle speed etc., when such information is displayed on the display device placed at the center of the front side of the front seat than when he/she looks deep into the display panel placed in the instrument panel. In this case, the fellow passenger on the assistant driver's seat is not required to know a transition of the vehicle traveling condition in response to the driving operation by the driver, and is only required to confirm the vehicle traveling condition (for example, the vehicle speed, etc.) at that time. Thus, on the display device placed at the center of the front side of the front seat, it is not necessary to make a meter display similar to that on the display device placed in the instrument panel by downscaling the car navigation screen, the audio-playback operation screen or the video display screen for DVD playback or TV, and it is sufficient that the vehicle traveling condition be displayed in a simplified manner.

As described above, even in the case of displaying the same information, if such a display form is applied that takes into account visibility or safety according to the target user of each display device, the vehicle traveling condition and the operation by the user, it would be possible to achieve improving usability for the driver and the fellow passenger.

This invention has been made to solve the problems as described above, and an object thereof is to achieve a display control system that can present information in a display form well-suited to the target user watching the display device.

Means for Solving the Problems

A display control system according to the invention is a display control system for displaying screens of a plurality of application units on a plurality of display devices mounted in a moving object, which is characterized by comprising: an image processor that inputs screen data in which screens for displaying sets of application information generated by the plurality of application units in a normal display form are drawn, and screen data in which screens for displaying the sets of application information in a simplified display form are drawn, to thereby generate display-screen data for each of the display devices, using the screen data in which the screens for displaying in the normal display form are drawn and the screen data in which the screens for displaying in the simplified display form are drawn; a display output driver that outputs the display-screen data generated by the image processor to corresponding one of the display devices to be displayed thereon; and a controller that, based on information indicating the application information corresponding to each of the display devices, determines whether or not the application information corresponds to the display device, among these screen data, selects for the application information matched to the display device, screen data in which the screen for displaying in the normal display form is drawn, and selects for the application information unmatched to the display device, screen data in which the screen for displaying in the simplified display form is drawn, followed by controlling based on these selected screen data to cause the image processor to generate the display-screen data for said each of the display devices.

EFFECT OF THE INVENTION

According to this invention, such an effect is provided that the information can be presented in a display form well-suited to the target user watching the display device.

BRIEF DESCRIPTION OF THE DRAWINGS

FIG. 6 is a diagram showing an example of a communication format of screen-display information transmitted from an application unit to an image integration control microcomputer.

FIG. 9 is a diagram showing an example of a communication format of screen-display information transmitted from the image integration control microcomputer to an application unit.

MODES FOR CARRYING OUT THE INVENTION

Hereinafter, for illustrating this invention in more detail, embodiments for carrying out the invention will be described with reference to the drawings.
Embodiment 1.

Figure 1:
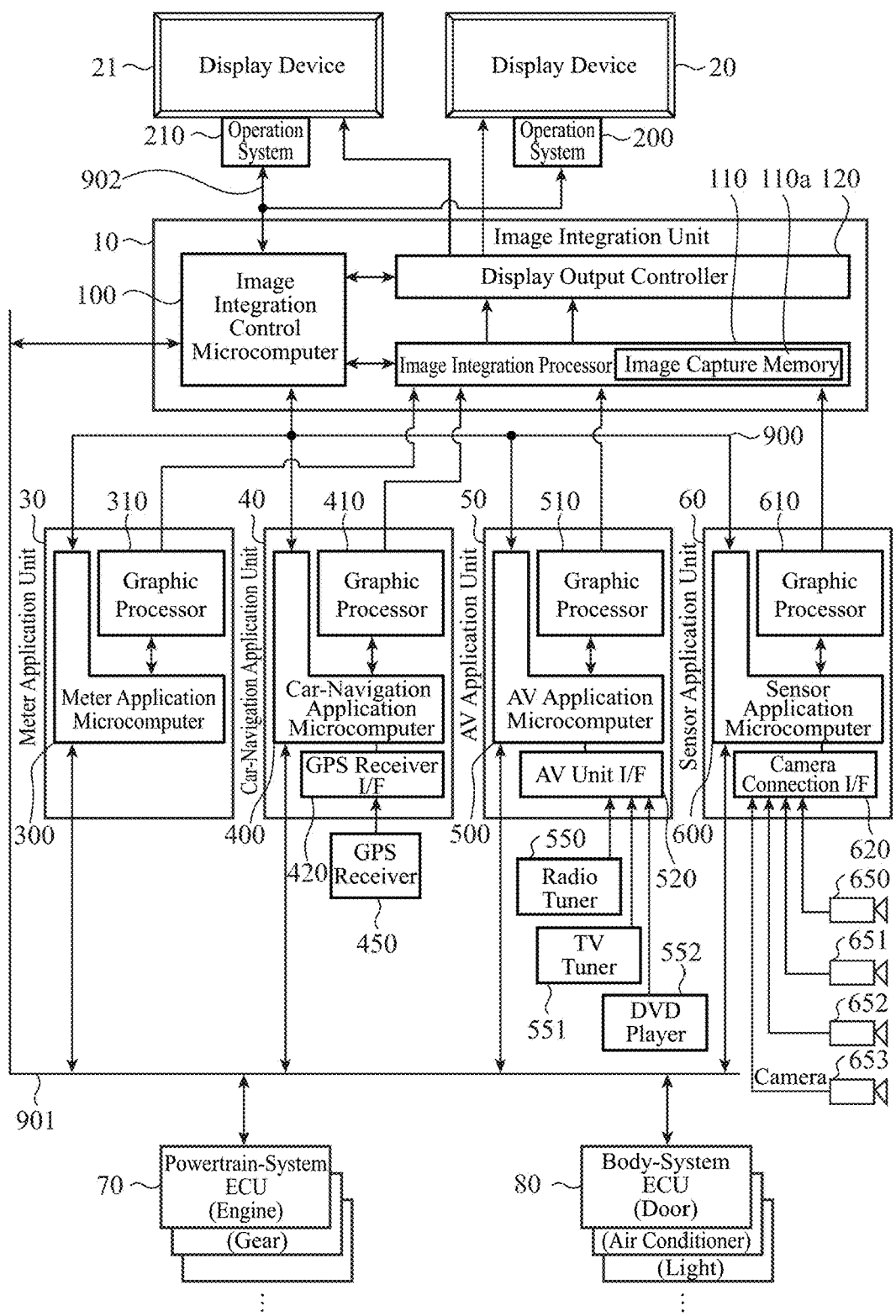
FIG. 1 is a block diagram showing a configuration of a display control system according to Embodiment 1 of the preset invention.

FIG. 1 is a block diagram showing a configuration of a display control system according to Embodiment 1 of the invention. The display control system according to Embodiment 1 is such a system that is installed in a moving object (for example, a vehicle) so as to display screens of a plurality of application units 30-60 on display devices 20, 21 placed in the moving object, and which is configured with an image integration unit 10, the display devices 20, 21, a meter application unit 30, a car-navigation application unit 40, an AV application unit 50 and a sensor application unit 60. Note that, in the example of FIG. 1, the display control system is assumed to be a system that is installed in a vehicle. Further, in the example of FIG. 1, although a case is shown where the screens are displayed on the two display devices 20, 21, this invention is also applicable to when a number of the display devices are three or more.

The image integration unit 10 is a control unit that executes main processing of the display control system according to Embodiment 1, and is configured with an image integration control microcomputer 100, an image integration processor 110 and a display output controller 120. The image integration control microcomputer 100 is communicably connected to a powertrain-system ECU (Electronic Control Unit) 70 and a body-system ECU 80 to thereby acquire from these ECUs 70 and 80, information given as determinative factors when a screen layout of the screens to be displayed on each of the display devices 20, 21 is determined.

The image integration control microcomputer 100 is a controller that, among screens drawn in screen data in which screens for displaying sets of application information generated by the application units 30-60 in a normal display form and screens for displaying them in a simplified display form are both drawn, selects for the application information matched to an intended-use of each of the display devices 20, 21, the screen for displaying in the normal display form, and selects for the application information unmatched to the intended-use of each of the display devices 20, 21, the screen for displaying in the simplified display form, followed by controlling to cause the image integration processor 110 to extract from the screen data, each screen data in which each of the selected screens is drawn and to generate based on the extracted screen data, display-screen data for each display device.

Note that the application units 30-60 may separately generate screen data in which the screens for displaying the sets of application information in the normal display form are drawn and screen data in which the screens for displaying the sets of application information in the simplified display form are drawn.

In this case, among the screen data in which the screens for displaying the sets of application information generated by the application units 30-60 in the normal display form are drawn and the screen data in which the screens for displaying the sets of application information in the simplified display form are drawn, the image integration control microcomputer 100 selects for the application information matched to the intended-use of each of the display devices 20, 21, screen data in which the screen for displaying in the normal display form is drawn, and selects for the application information unmatched to the intended-use of each of the display devices 20, 21, screen data in which the screen for displaying in the simplified display form is drawn, followed by controlling based on these selected screen data to cause the image integration processor 110 to generate the display-screen data for each display device.

In the followings, description will be made about a case where the application units 30-60 generate the screen data in which the screens for displaying the sets of application information in the normal display form and the screens for displaying them in the simplified display form are both drawn, and the image integration processor 110 extracts from the screen data, the screens selected by the image integration control microcomputer 100 to thereby generate the display-screen data.

The image integration processor 110 is an image processor that inputs the screen data in which drawn are the respective screens for displaying both in the normal display form (screens for normal display) and in the simplified display form (screens for simplified display) the sets of application information obtained through processing of the respective applications by the application units 30-60, to thereby generate the screen data for each of the display devices 20, 21 using the screen data in which these screens are drawn. Note that, as described previously, the image integration processor 110 may separately input the screen data in which the screens for displaying the sets of application information generated by the application units 30-60 in the normal display form are drawn and the screen data in which the screens for displaying the sets of application information in the simplified display form are drawn, to thereby generate the display-screen data for each display device, using the screen data in which the screens for displaying in the normal display form are drawn and the screen data in which the screen for displaying in the simplified display form are drawn.

Further, in the image integration processor 110, an image capture memory 110a is provided. The image capture memory 110a has an image-capturing area for storing respective screen data inputted respectively from the application units 30-60, and further has, for each of the display devices 20, 21, a frame buffer area that stores for every frame unit the display-screen data generated by the image integration processor 110.

For example, as a hardware configuration, the image integration processor 110 is configured with an image input unit, a writing/reading unit, an image enlarging/reducing and overlapping unit, a rendering function unit, and a microcomputer-controlled interface. Here, the image input unit inputs (captures) screen data from the application units 30-60. The writing/reading unit performs processing of writing the screen data inputted by the image input unit in the image capture memory 110a and processing of reading out the screen data selected by the image integration control microcomputer 100 from the image capture memory 110a. The image enlarging/reducing and overlapping unit performs image processing of enlarging or reducing the image of the screen data selected by the image integration control microcomputer 100 and processing of overlapping the images of plural screen data. The rendering function unit itself performs graphics rendering under control of the image integration control microcomputer 100. For example, it renders a menu screen and the like. The microcomputer-controlled interface is an interface that relays data transfer between the image integration control microcomputer 100 and the image integration processor 110.

The display output controller 120 is hardware that generates and outputs image signals and vertical/horizontal synchronizing signals to be matched to each interface of the display devices 20, 21, and is a display output driver that causes the display-screen data generated by the image integration processor 110 to be outputted to and displayed on a corresponding display device. For example, the display output controller 120 reads out the display-screen data from the frame buffer area in the image capture memory 110a, to thereby output it to the corresponding display device.

The display device 20 is configured by use of an LCD monitor, etc. placed in the instrument panel of the vehicle, and is a display device having an intended-use of presenting information related to the vehicle traveling condition to the driver. That is, the target user to watch the display device 20 is the driver.

Examples of the information related to the vehicle traveling condition include, for example, a vehicle speed, an engine revolution number, a gear position, a travel distance, a fuel residual amount, a winker display, a warning display and the like. Further, as a configuration associated with the display device 20, there is provided an operation system 200 for performing operation on the basis of the display screen of the display device 20. Examples of the operation system 200 include, for example, a remote controller mounted on a steering wheel, and the like.

The display device 21 is configured by use of an LCD monitor, etc. placed at the center of the front side of the front seat in the vehicle, and is a display device having an intended-use of presenting car navigation information, AV information and sensor-detected information indicative of vehicle periphery information, to the driver or the fellow passenger on the assistant driver's seat. That is, the target user to watch the display device 21 is the fellow passenger on the assistant driver's seat, or the driver when the vehicle is stopping.

Note that examples of the car-navigation information include a periphery map of the host vehicle and route guide information.

Examples of the AV information include information for audio playback, video playback and the like, and examples of the sensor-detected information include a vehicle-periphery capture image captured by an in-vehicle camera.

Further, as a configuration associated with the display device 21, there is provided an operation system 210 for performing operation on the basis of the display screen of the display device 21. Examples of the operation system 210 include, for example, a touch panel mounted on the screen of the display device 21, and the like.

The meter application unit 30 is an application unit that generates screen data for meter-display related to the vehicle traveling condition, and is configured with a meter application microcomputer 300 and a meter-display graphic processor 310.

The meter application microcomputer 300 is a microcomputer that acquires the information related to the vehicle traveling condition from the powertrain-system ECU 70, to thereby measure numerical information related to the vehicle traveling condition.

The graphic processor 310 executes an application for making a meter display about the numerical information related to the vehicle traveling condition and measured by the meter application microcomputer 300, to generate screen data in which a meter-display screen is drawn.

The car-navigation application unit 40 is an application unit that generates screen data for car navigation, and is provided as a component of a car-navigation apparatus, for example. Further, the car-navigation application unit 40 is configured with a car-navigation application microcomputer 400, a car-navigation graphic processor 410 and a GPS (Global Positioning System) receiver interface (I/F) 420. The car-navigation-application microcomputer 400 is a microcomputer that acquires GPS information from a GPS receiver 450 through the GPS receiver I/F 420, and reads out map data from a map database (unshown in FIG. 1), to perform navigation processing on the basis of these information.

The graphic processor 410 executes an application for displaying information obtained from the navigation processing by the car-navigation application microcomputer 400, to generate screen data in which a car-navigation screen is drawn.

The AV application unit 50 is an application unit that generates screen data for AV playback, and is configured with an AV application microcomputer 500, an AV playback graphic processor 510 and an AV unit interface (I/F) 520.

The AV application microcomputer 500 is a microcomputer that performs, through the AV unit I/F 520, AV-playback processing about a radio tuner 550, a TV tuner 551 and a DVD player 552.

The graphic processor 510 executes an application for displaying information obtained from the AV-playback processing by the AV application microcomputer 500, to generate screen data in which an AV-playback screen is drawn.

The sensor application unit 60 is an application unit that generates screen data for displaying sensor-detected information, and in the example shown in FIG. 1, it generates screen data of the sensor-detected information indicative of vehicle periphery information captured by the in-vehicle cameras. Further, the sensor application unit 60 is configured with a sensor application microcomputer 600, a sensor-detected-information display graphic processor 610 and a camera connection interface (I/F) 620.

The sensor application microcomputer 600 is a microcomputer that performs analysis processing of vehicle periphery images captured by the in-vehicle cameras 650-653, through the camera connection I/F 620.

The graphic processor 610 executes an application for displaying the vehicle periphery images captured by the in-vehicle cameras 650-653 and an image analysis result by the sensor application microcomputer 600, to generate screen data in which the vehicle periphery capture images and the image analysis result are drawn.

Note that it is not necessarily required that the meter application unit 30, the car-navigation application unit 40, the AV application unit 50 and the sensor application unit 60 exist independently of each other.

For example, there may instead be provided an application unit in which functions of the plurality of these application units are consolidated into one, thus configuring this application unit to output the screen data of the respective sets of application information such as about a meter display, a car-navigation display, an AV-playback display and/or a sensor-detected information display.

The powertrain-system ECU 70 is an ECU that performs electronic control of a power transmission mechanism of the vehicle that installs the present system, and retains information such as a vehicle speed, an engine revolution number, a gear position and the like.

The body-system ECU 80 is an ECU that performs electronic control of vehicle body electronics operated by the user in the vehicle that installs the present system, and retains information indicative of conditions of a door, an air conditioner, a light, a mirror and the like.

A communication line 900 is a communication line that communicably connects to each other the image integration control microcomputer 100 and the microcomputers of the respective application units 30-60, and is realized for example as a communication line for low-speed serial communications, I2C (Inter-Integrated Circuit) communications, CAN (Controller Area Network) communications or the like.

An in-vehicle communication network 901 is a communication network that communicably connects to each other the image integration control microcomputer 100, the microcomputers of the respective application units 30-60, the powertrain-system ECU 70 and the body-system ECU 80, and is realized for example as a communication network for CAN communications, LIN (Local Interconnect Network) communications, FlexRay communications or the like. Upon notified of the information retained by the ECUs 70, 80 through the in-vehicle communication network 901, the image integration control microcomputer 100 and the microcomputers of the respective application units 30-60 can recognize the vehicle traveling condition.

A communication line 902 is a communication line that communicably connects to each other the image integration control microcomputer 100 and the operation systems 200, 210 associated with the respective display devices 20, 21, and is realized for example as a communication line for low speed serial communications, I2C communications, CAN communications or the like. Note that the communication line 902 is provided as a line different to the communication line 900.

Next, the screen data generated by each of the application units 30-60 will be described citing specific examples.

Figure 2:
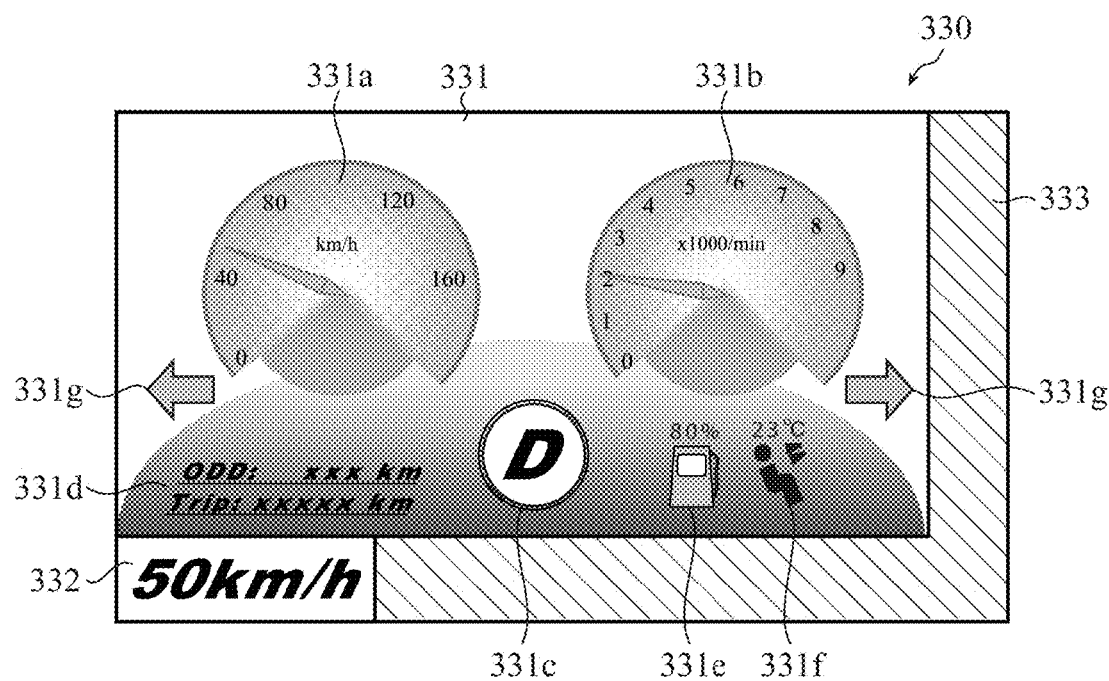
FIG. 2 is a diagram showing an example of screen data generated by a meter application unit.

FIG. 2 is a diagram showing an example of the screen data generated by the meter application unit. As shown in FIG. 2, in the screen data 330 for meter display generated by the meter application unit 30, a meter standard-screen 331 and a meter sub-screen 332 are included.

The meter standard-screen 331 is a screen that displays in a normal display form, respective sets of information acquired by the meter application microcomputer 300 from the powertrain-system ECU 70 and the body-system ECU 80. Here, the normal display form about the meter application is assumed to be a display form in which the respective sets of information are displayed as an image that simulates an instrument panel placed in the instrument panel of general vehicles.

A speed meter display portion 331a displays a current vehicle speed by an image of a general speed meter. A tachometer display portion 331b displays a current engine revolution number (revolution speed) by an image of a general tachometer. Further, a gear display portion 331c displays a character indicative of a current gear position. A travel distance display portion 331d displays respective values of an odometer and a trip meter as numeric values. A fuel residual amount display portion 331e displays a fuel residual amount by a percentage and an image. An air conditioner display portion 331f displays a setup temperature of an in-vehicle air conditioner by a numeric value and an image . A winker display screen 331g displays a lighting direction of a winker by an arrow image.

The meter sub-screen 332 is a screen that displays in a simplified display form, information in the meter standard-screen 331. Here, the simplified display form about the meter application is assumed to be a display form in which information related to the vehicle traveling condition is displayed in a simplified manner using an easily-watchable character or graphic.

In the example shown in FIG. 2, in the meter sub-screen 332, the vehicle speed "50 km/h", which is displayed in the speed meter display portion 331a, is displayed using large font characters.

Note that, as shown in FIG. 2, the screen data 330 is data resulted from drawing the meter standard-screen 331 and the meter sub-screen 332 on a virtual screen 333. For allowing the meter sub-screen 332 to be drawn, the virtual screen 333 is assumed to be a screen that is larger in size than the screen of the display device 20 placed in the instrument panel, that is, the display device with the intended-use of displaying information related to the vehicle traveling condition. The shaded portion in FIG. 2 is a blank display, showing an area with nothing drawn.

Figure 3:
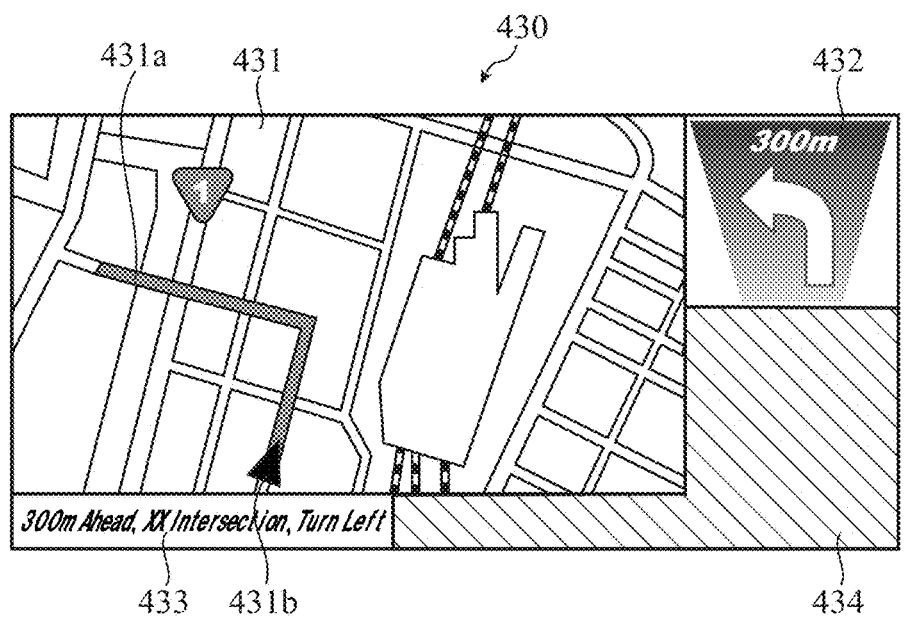
FIG. 3 is a diagram showing an example of screen data generated by a car-navigation application unit.

FIG. 3 is a diagram showing an example of the screen data generated by the car-navigation application unit. As in FIG. 3, in the screen data 430 for car navigation display generated by the car-navigation application unit 40, a car-navigation standard-screen 431 and car-navigation sub-screens 432, 433 are included.

The car-navigation standard-screen 431 is a screen that displays in a normal display form, information obtained from navigation processing executed by the car-navigation application microcomputer 400 on the basis of the GPS information acquired from the GPS receiver 450 and the map data readout from the map database.

Here, the normal display form about the car navigation application is assumed to be a display form in which, as shown in FIG. 3, a periphery map of the host vehicle is displayed with an guide route 431a and a host-vehicle position mark 431b overlapped on the screen of that map. The guide route 431a is a guide route having been searched by the car-navigation application microcomputer 400, and the host-vehicle position mark 431b is a mark indicative of a host-vehicle position based on the GPS information.

The car-navigation sub-screens 432, 433 are each a screen that displays in a simplified display form, information in the car-navigation standard-screen 431. Here, the simplified display form about the car navigation application is assumed to be a display form in which the route guide information is displayed in a simplified manner using an easily-watchable character or graphic.

In the example shown in FIG. 3, since the host vehicle is going to be turned to the left at an intersection placed 300 meters ahead according to the route guide information, in the car-navigation sub-screen 432, there is expressed "a situation of having to turn to the left at 300 meters ahead" using a character and an arrow graphic, and in the car-navigation sub-screen 433, there is provided a display only by characters as "300 m Ahead, XX Intersection, Turn Left".

Note that, as shown in FIG. 3, the screen data 430 is data resulted from drawing the car-navigation standard-screen 431 and the car-navigation sub-screens 432, 433 on a virtual screen 434. For allowing the car-navigation sub-screens 432, 433 to be drawn, the virtual screen 434 is assumed to be a screen that is larger in size than the screen of the display device 21 placed at the center of the front side of the front seat, that is, the display device having the intended-use of presenting the car navigation information, the AV information and the vehicle periphery information. The shaded portion in FIG. 3 is a blank display, showing an area with nothing drawn.

Figure 4:
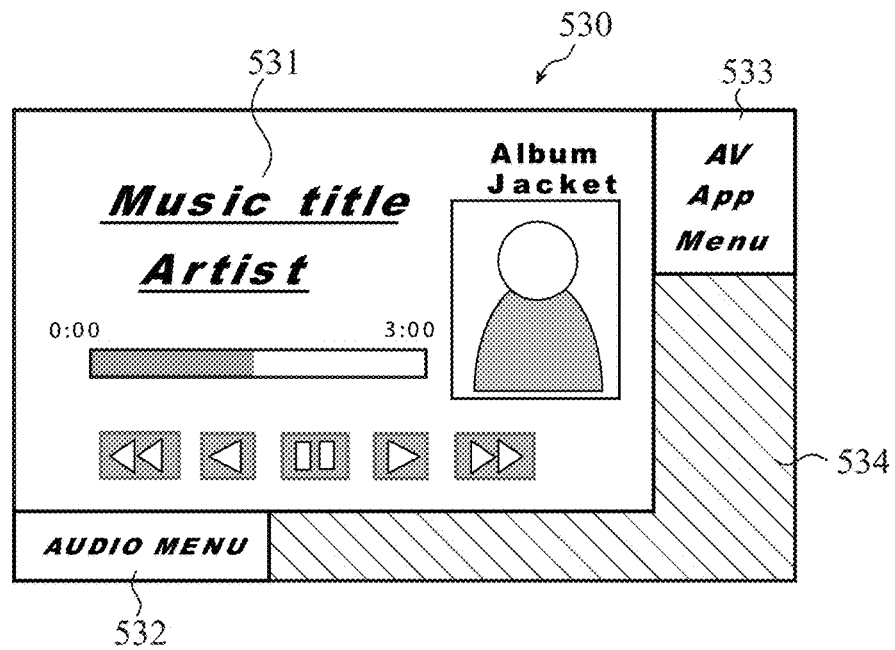
FIG. 4 is a diagram showing an example of screen data generated by an AV application unit.

FIG. 4 is a diagram showing an example of the screen data generated by the AV application unit. As shown in FIG. 4, in the screen data 530 for AV playback generated by the AV application unit 50, an AV application standard-screen 531 and AV application sub-screens 532, 533 are included.

The AV application standard-screen 531 is a screen that displays in a normal display form, information related to an audio that the AV application microcomputer 500 plays back by executing an AV playback application. Here, the normal display form about the AV application is assumed to be a display form in which a general audio-playback operation screen is displayed as shown in FIG. 4.

The AV application sub-screens 532, 533 are each a screen that displays in a simplified display form, information in the AV application standard-screen 531. Here, the simplified display form about the AV application is assumed to be a display form in which information about a playback-target AV is displayed in a simplified manner using an easily-watchable character or graphic. in the example shown in FIG. 4, in the AV application sub-screen 532, a menu about the playback-target songs included in an audio album is displayed by characters, and in the AV application sub-screen 533, a menu about the target AV application (a radio, a television, a DVD, etc.) is displayed by characters.

Note that, as shown in FIG. 4, the screen data 530 is data resulted from drawing the AV application standard-screen 531 and the AV application sub-screens 532, 533 on a virtual screen 534. For allowing the AV application sub-screens 532, 533 to be drawn, the virtual screen 534 is assumed to be a screen that is larger in size than the screen of the display device 21 placed at the center of the front side of the front seat, that is, the display device having the intended-use of presenting the car navigation information, the AV information and the vehicle periphery information. The shaded portion in FIG. 4 is a blank display, showing an area with nothing drawn.

Figure 5:
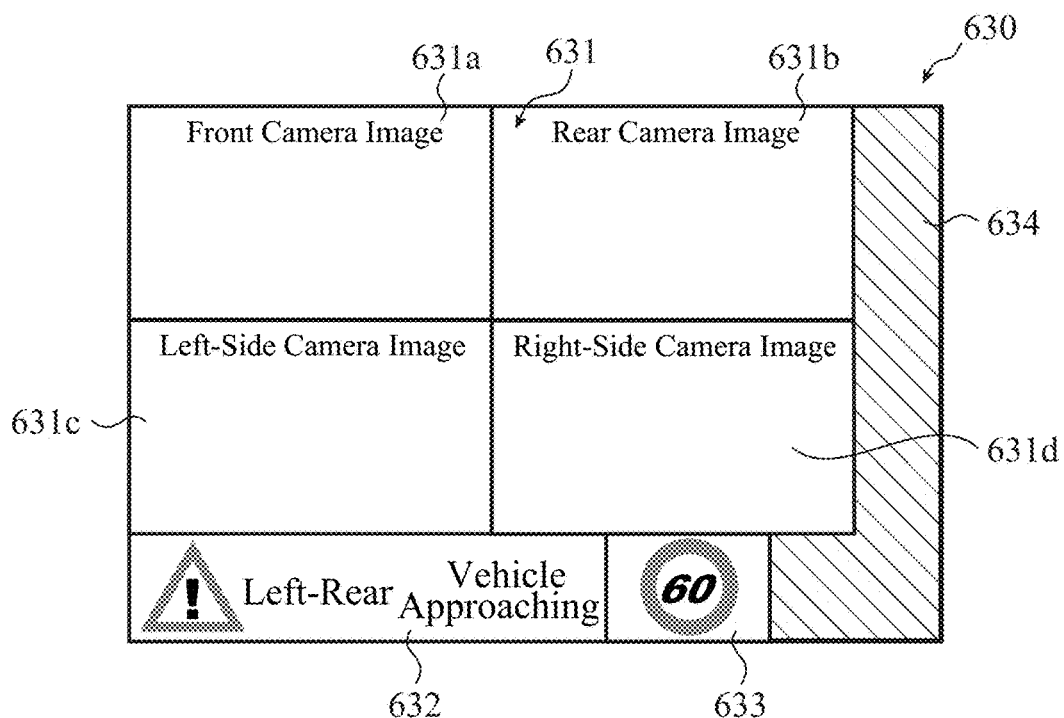
FIG. 5 is a diagram showing an example of screen data generated by a sensor application unit.

FIG. 5 is a diagram showing an example of the screen data generated by the sensor application unit. As shown in FIG. 5, in the screen data 630 used for displaying sensor-detected information and generated by the sensor application unit 60, a sensor application standard-screen 631 and sensor application sub-screens 632, 633 are included.

The sensor application standard-screen 631 is a screen that displays in a normal display form, vehicle-periphery capture images captured by the in-vehicle cameras 650-653 and host-vehicle periphery information detected by analyzing the capture images by the sensor application microcomputer 600.

Here, the normal display form about the sensor application is assumed to be a display form in which screens 631a-631d including the respective images captured by the in-vehicle cameras 650-653 and the host-vehicle periphery information obtained by analyzing them, are displayed as shown in FIG. 5.

For example, when, by the image analysis, a situation is found in which a left rear vehicle captured in the image screen 631c of the left side camera is approaching to the host vehicle, the former vehicle is highlighted or a warning message is displayed in the image screen 631c of the left side camera.

The sensor application sub-screens 632, 633 are each a screen that display in a simplified display form, information in the sensor application standard-screen 631. Here, the simplified display form about the sensor application is assumed to be a display form in which the sensor-detected information detected by analyzing the capture images is displayed in a simplified manner using an easily-watchable character or graphic.

In the example shown in FIG. 5, in the sensor application sub-screen 632, an image analysis result that the left rear vehicle is approaching to the host vehicle is displayed by characters and a graphic, and in the sensor application sub-screen 633, a warning sign about a speed limit detected by the front camera is displayed by characters and a graphic.

Note that, as shown in FIG. 5, the screen data 630 is data resulted from drawing the sensor application standard-screen 631 and the sensor application sub-screens 632, 633 on a virtual screen 634. For allowing the sensor application sub-screens 632, 633 to be drawn, the virtual screen 634 is assumed to be a screen that is larger in size than the screen of the display device 21 placed at the center of the front side of the front seat, that is, the display device having the intended-use of presenting the car navigation information, the AV information and the sensor-detected information. The shaded portion in FIG. 5 is a blank display, showing an area with nothing drawn.

The respective screen data 330-630 shown in FIGS. 2-5 are inputted as image signals in the image integration processor 110 of the image integration unit 10 from the respective application units 30-60. At this time, information related to the screens drawn in each of the screen data 330-630 is notified to the image integration control microcomputer 100 through the communication line 900 from each of the dedicated microcomputers 300-600 of the application units 30-60. Based on the notified information, the image integration control microcomputer 100 controls to cause the image integration processor 110 to extract the screens matched to the intended-uses of the display devices 20, 21 from the respective screen data 330-630.

FIG. 6 is a diagram showing an example of a communication format of the screen-display information transmitted from the application unit to the image integration control microcomputer. Further, FIG. 7 is a diagram showing the screen data of FIG. 2 and sizes of respective screens therein.

As shown in FIG. 6, the communication format is configured as data strings on a two-byte basis.

Further, in the communication format, there is each set: data indicative of application-screen display information as a communication command type; a communication data size on the communication format; an address of the communication-destination microcomputer (image integration control microcomputer 100); and addresses of the communication-source microcomputers (the microcomputers 300-600 corresponding to the application units). Furthermore, sets of information of the screens actually drawn in the screen data 330-630 are set therein.

Figures 7, 8:
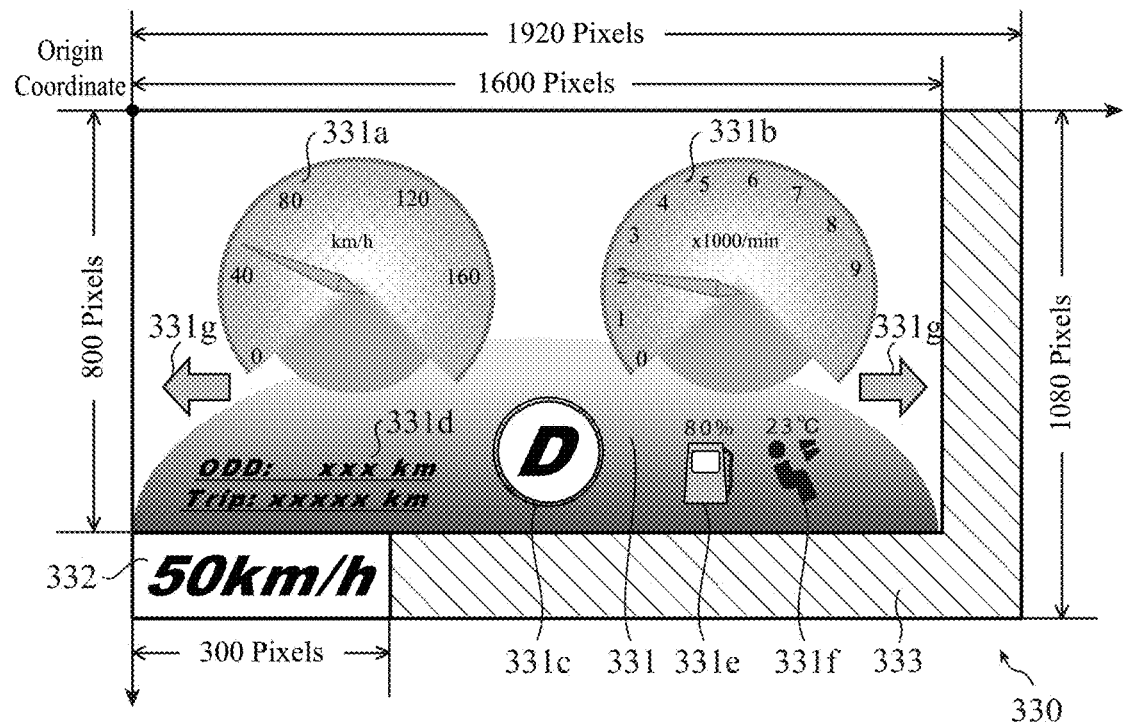
FIG. 7 is a diagram showing the screen data of FIG. 2 and sizes of respective screens therein.
FIG. 8 is a diagram showing an example of an intended-use correspondence list.

For example, in the case of the screen data 330 shown in FIG. 7, the total screen size is given as a number of lateral pixels of 1920 and a number of vertical pixels of 1080.

Further, since the meter standard-screen 331 and the meter sub-screen 332 are drawn in the screen data 330 shown in FIG. 7, there is set "2" as a number of internal display screens in the communication format shown in FIG. 6. In the subsequent data strings, respective sets of detailed information about these two screens are set. Here, when the meter standard-screen 331 is defined as "Internal Display Screen 1" in FIG. 6, in "Internal Display Screen 1 - Type/ID", a value to distinguish between the standard-screen and the sub-screen is set for "Type" and a value capable of identifying respective these screens and further identifying the application units that generate these screens, is set for "ID".

For example in the case of the meter standard-screen 331 in FIG. 7, in "Internal Display Screen 1 - Size", there are set a number of lateral pixels of 1600 and a number of vertical pixels of 800.

Further, in "Internal Display Screen 1 - Display Position", there is set a lateral pixel position of "0" and a vertical pixel position of "0".

In "Internal Display Screen 1 - Display Content", there is set, for example, information of a screen display format or information indicative of a display priority in the meter application unit 30. Note that information about "Internal Display Screen 2" (here, meter sub-screen 332) is also set in a similar manner.

Note that the screen display format is a display format exemplified by an analog meter-display format/digital meter-display format, and a display format for partially displaying the meter display information in a simplified manner (digital display of the speed).

Further, the display priority indicates, for each general meter display (speed, engine revolution number, shift information, etc.) or each warning display based on the vehicle information, its degree of impact on safety during traveling unless otherwise immediately notified to the driver.

The respective screen data 330-630 from the respective application units 30-60 are inputted in the image integration processor 110 in the image integration unit 10 and are written in the image capture memory 110a in the image integration processor 110. At the time of completion of writing these screen data on a single frame basis, the image integration control microcomputer 100 selects the screens to be displayed on the display devices 20, 21 on the basis of the screen-display information as shown in FIG. 6 having been notified from the application units 30-60, and indicates them to the image integration processor 110.

Namely, based on the address of the communication-source microcomputer (address of the microcomputer dedicated to each application) that is an identifier for identifying a communication-source application and included in the screen-display information, the image integration control microprocessor 100 determines from what application unit the screen-display information has been transmitted.

Then, referring to an intended-use correspondence list, the image integration control microcomputer 100 determines whether application information is the application information matched to the intended-use of each display device or the application information unmatched to the intended-use of the display device.

Note that, as shown in FIG. 8, the intended-use correspondence list is data showing for every display device whether or not each application is matched to the intended-use of the display device. In FIG. 8, "o" mark indicates the application information matched to the intended-use and "x" mark indicates the application information unmatched to the intended-use.

According to the indication from the image integration control microprocessor 100, the image integration processor 110 extracts the screens from the screen data written in the image capture memory 110a.

The screens extracted to be displayed on the display device 20 and the screens extracted to be displayed on the display device 21 (hereinafter, each called as extracted screens, when appropriate) are copied, according to a screen layout determined for each display device by the image integration control microcomputer 100, into the areas corresponding to the positions in the frame buffer areas for the display devices at which the extracted screens are to be displayed. Note that the frame buffer area may be formed in a partial area of the image capture memory 110a.

When the extracted screens are to be copied into the frame buffer area, if the size of the area for drawing in the frame buffer and the size of each of the extracted screens are different to each other, the image integration control microcomputer 100 instructs the image integration processor 110 to enlarge or reduce the extracted screen according to the difference therebetween. This causes the image integration processor 110 to copy the extracted screen after processing it according to the instruction from the image integration control microprocessor 100, into the frame buffer area. This makes it possible to properly make a screen layout using the extracted screens.

After completion of copying all screens necessary for screen layout display, the image integration control microcomputer 100 instructs the display output controller 120 to read out the display-screen data from the respective frame buffer areas for the display devices 20, 21.

The display output controller 120 transmits these display-screen data read out from the frame buffer areas, as image signals in which clock and synchronization signals are added in conformity with respective signal interfaces of the display devices, to the display devices 20, 21 to be displayed thereon.

The processing described up to the above is performed repeatedly for every one frame.

The image integration control microcomputer 100 manages a screen drawing state in each of the frame buffer areas corresponding to the display devices 20, 21, that is, a display state of each screen on the display devices 20, 21.

Then, the image integration control microcomputer 100 notifies the microcomputers 300-600 in the application units 30-60 about display states of the screens on the display devices 20, 21 as screen-display information, through the communication line 900. Based on the screen-display information, the microcomputers 300-600 can recognize how the screen data 330-630 outputted by themselves are displayed on the display devices 20, 21.

FIG. 9 is a diagram showing an example of a communication format of the screen-display information transmitted from the image integration control microcomputer to the application unit. Here, similar to in FIG. 6, the communication format is configured as data strings on a two-byte basis. In the communication format, as shown in FIG. 9, there is each set: data indicative of display information as a communication command type for the display device; a communication data size on the communication format; addresses of the communication-destination microcomputers (the microcomputers 300-600 dedicated to the respective application units); and an address of the communication source microcomputer (image integration control microcomputer 100). Furthermore, there is sequentially set display information of respective screens actually displayed on each of the display devices 20, 21.

In the display information, there is each set: a number of screens used in the display screen among the screens drawn in the screen data 330-630 outputted by the respective application units 30-60; a display device number for identifying the display device that displays the screen; an internal display screen ID of the application unit in use for the display screen; a display size and a display position on the screen of the display device.

Next, processing of determining a screen layout by the image integration control microcomputer 100 will be described.

From among the screens drawn in the screen data outputted from the respective application units 30-60, the image integration control microcomputer 100 extracts for the application information matched to the intended-use of the display device, the screen for displaying in the normal display form, and extracts for the application information unmatched to the intended-use of the display device, the screen for displaying in the simplified display form, to thereby determine a screen layout including these screens.

Figure 10:
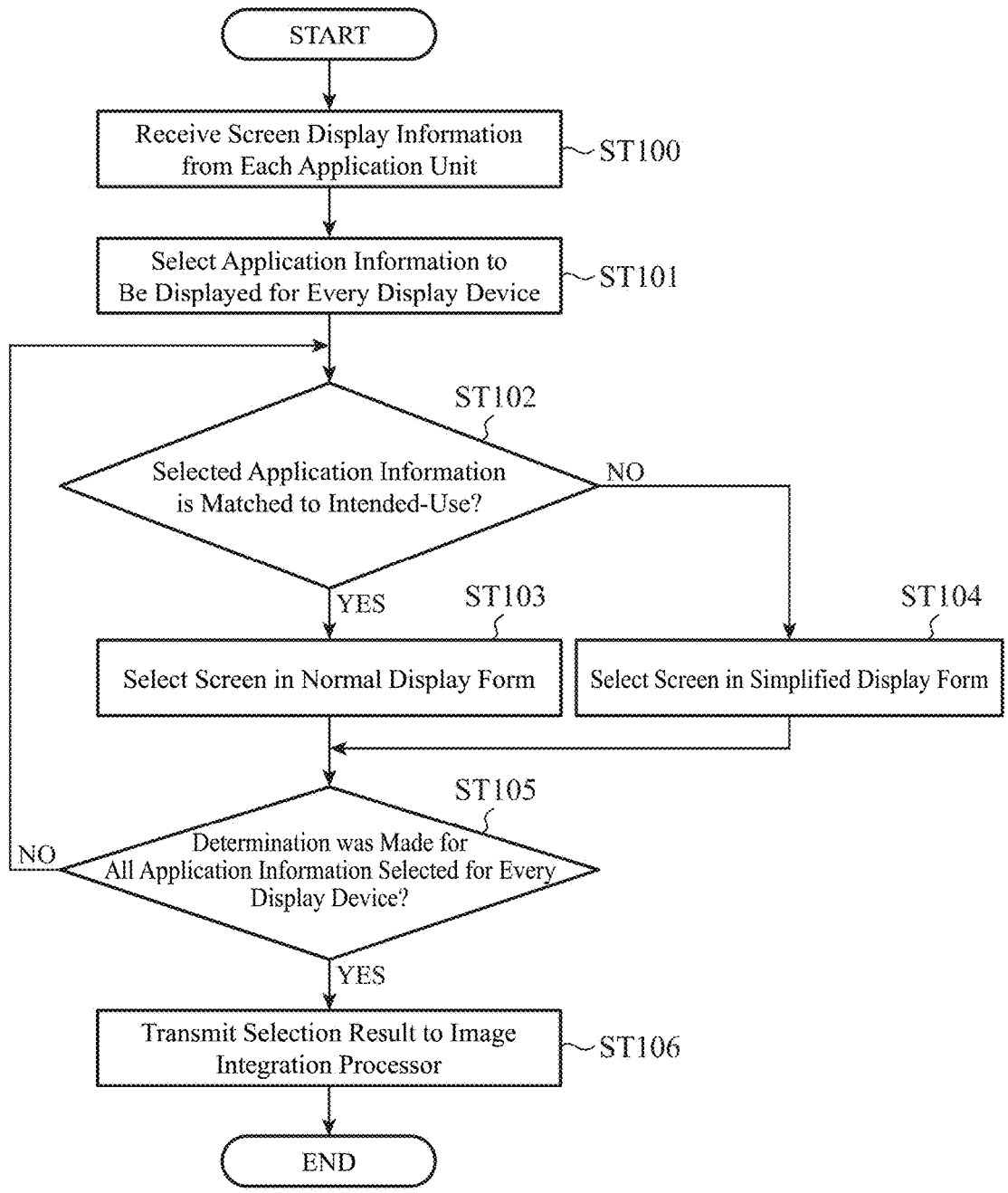
FIG. 10 is a flowchart showing an operation of the image integration control microcomputer.

FIG. 10 is a flowchart showing an operation of the image integration control microcomputer. The image integration control microcomputer 100 receives the screen-display information from the respective application units 30-60 (Step ST100). Then, referring to the screen-display information, the image integration control microcomputer 100 selects for every display device the application information to be displayed thereon (Step ST101).

Referring to the intended-use correspondence list, the image integration control microcomputer 100 determines whether or not the selected application information is matched to an intended-use of the display device (Step ST102).

In the case of the application information matched to the intended-use of the display device (Step ST102; YES), the image integration control microcomputer 100 selects for this application information, screen data for displaying in the normal display form (Step ST103). For example, in the case of the screen data in which screens in the normal display form and screens in the simplified display form are both drawn, the image integration control microcomputer 100 selects screen data in which the screen in the normal display form is drawn among these screens drawn in the screen data.

In contrast, in the case of the application information unmatched to the-intended use of the display device (Step ST102; NO), the image integration control microcomputer 100 selects for this application information the image data for displaying in the simplified display form (Step ST104). For example, in the case of the screen data in which screens in the normal display form and screens in the simplified display form are both drawn, the image integration control microcomputer 100 selects screen data in which the screen in the simplified display form is drawn among these screens drawn in the screen data.

Thereafter, the image integration microcomputer 100 determines whether the above determination has been made for all of the application information selected for every display device (Step ST105).

If there is the application information not yet subjected to the above determination (Step ST105; NO), the flow is returned to Step ST102 to repeat the above processing.

Further, when the above determination was made for all of the application information (Step ST105; YES), the image integration control microcomputer 100 transmits its selection result to the image integration processor 110 (Step ST106). This causes the image integration processor 110 to extract the screens of the selection result from among the screens drawn in the screen data.

For example, the display device 20 which is placed in the instrument panel and whose target to be watched is the driver, is a display device with the intended-use of performing the meter display about information related to the vehicle traveling condition. The image integration control microcomputer 100 determines the screens to be extracted, according to the intended-use preset for every display device.

In the case of the display device 20, for the application information (the meter display information) of the meter application unit 30, a screen that displays it in the normal display form as shown in FIG. 2 is selected as a screen to be extracted. For the application information of the other application units 40-60 than the meter application unit 30, a screen that displays it in the simplified display form is selected as a screen to be extracted.

Figure 11:
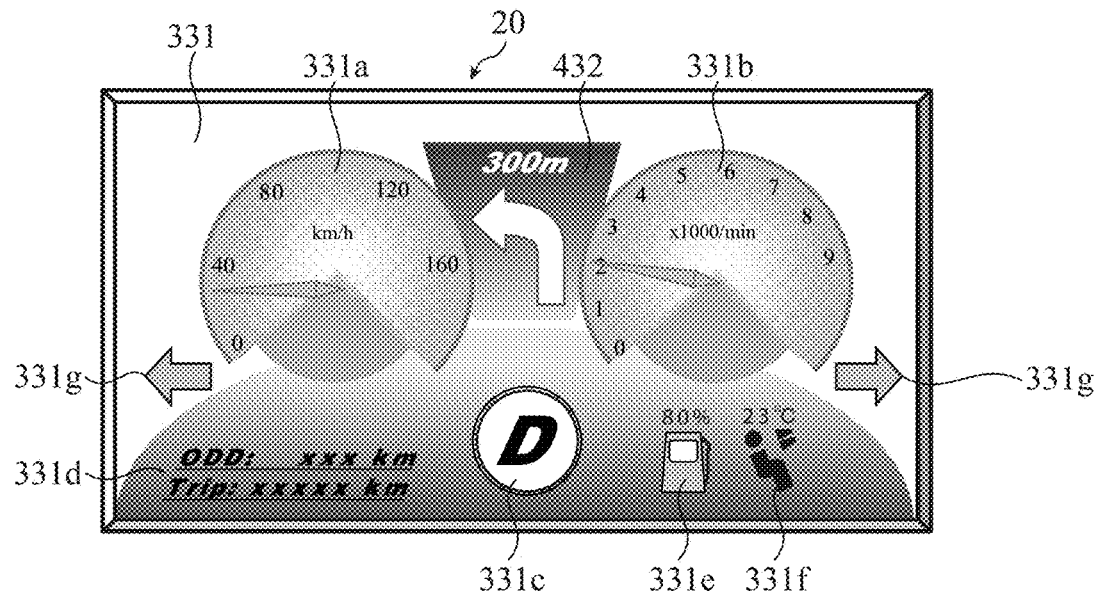
FIG. 11 is a diagram showing an example of a screen output of a display device placed in an instrument panel.

FIG. 11 is a diagram showing an example of a screen output of the display device placed in the instrument panel, in which shown is a case of displaying on the display device 20 a screen including the meter-display screen and the car navigation screen. The display screen in FIG. 11 is given with a screen layout in which the car-navigation sub-screen 432 shown in FIG. 3 is displayed as being overlapped on the meter standard-screen 331 shown in FIG. 2. On the display device 20 placed in the instrument panel, while watching the meter display about information related to the host-vehicle traveling condition in the normal display form, the driver can also watch the route guide information indicating the situation of turning to the left at 300 meters ahead, in the simplified display form using the arrow. This allows the driver to properly understand meter information necessary for driving, and further to understand the route guide information instantly, resulting in without getting distracted from driving.

Further, the image integration control microcomputer 100 controls to cause the image integration processor 110 to extract a screen of the application information specified by a user operation among the sets of application information unmatched to the intended-use of the display device 20 (sets of application information of the application units 40-60). For example, using a remote controller mounted on the steering wheel, or the like, the driver specifies the route guide information as the information to be displayed on the display device 20. Upon receiving this user operation, the image integration control microcomputer 100 selects the route guide information as the information to be displayed, and the image integration processor 110 extracts a screen for displaying the selected information in a simplified manner. This allows the information desired by the user to be displayed on his/her desired display device, thus making it possible to achieve improving the usability of the present system.

The user operation is not limited to an operation by the driver who is the target to watch the display device 20, and may be that by a fellow passenger on the assistant driver's seat who is the target to watch the display device 21.

For example, the fellow passenger operates the touch panel (operation system 210) mounted on the display device 21 to instruct the image integration control microcomputer 100 to display on the display panel 20 the route guide information displayed on the display device 21. In response thereto, the image integration control microcomputer 100 controls to cause the image integration processor 110 to extract a screen for displaying the route guide information in a simplified manner (car-navigation sub-screen 432), to thereby display on the display device 20 the display screen with a screen layout including the above screen.

The touch operation on the display device 21 may be a simple operation such as by dragging the guide route 431a on the touch surface toward the display device 20, or may also be an operation such as by depressing an icon corresponding to the display device 20.

Further, depending on the vehicle traveling condition, the image integration control microcomputer 100 may select the information to be displayed on the display device 20 among the sets of application information unmatched to the intended-use of the display device 20.

For example, the route guide information is pre-set to be displayed, during traveling of the vehicle, in the simplified display form in addition to the meter display.

Furthermore, when a warning becomes necessary based on the sensor-detected information, the warning based on the sensor-detected information may be displayed on the display device 20.

Figure 12:
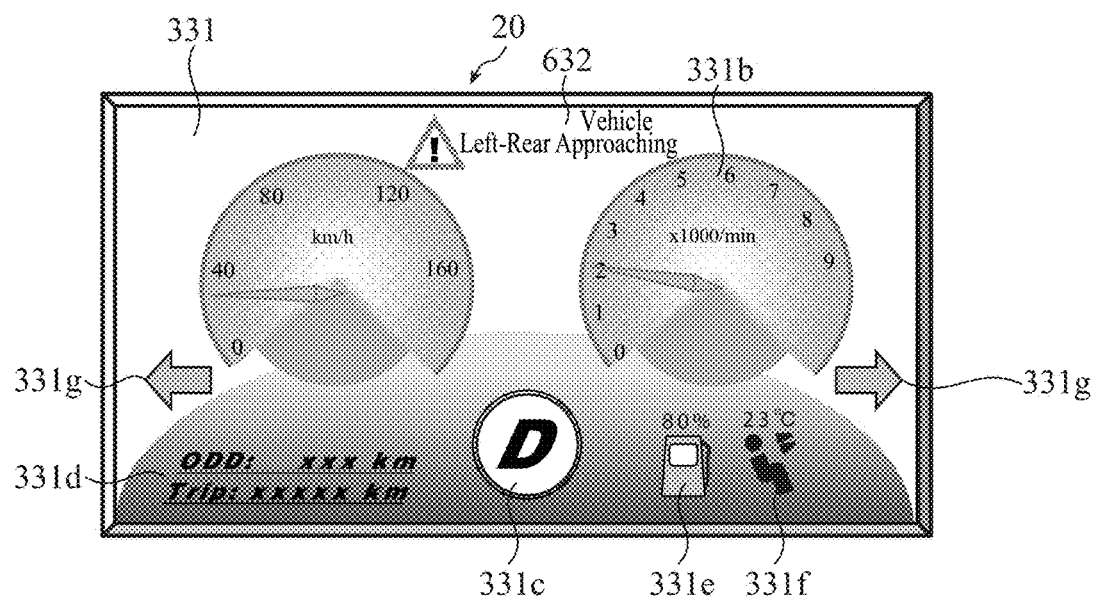
FIG. 12 is a diagram showing another example of the screen output of the display device placed in the instrument panel.

For example, as shown in FIG. 12, the display screen of the display device 20 is given with a screen layout in which the car-navigation sub-screen 632 shown in FIG. 5 is displayed as being overlapped on the meter standard-screen 331 shown in FIG. 2. The driver, even in this case, can properly understand meter information necessary for driving, and can further understand the warning content based on the sensor-detected information instantly.

Note that in the above case, the display priorities are included in the screen-display information transmitted from each of the application units 30-60 to the image integration microcomputer 100, and the display priorities each indicates, for each general meter display (speed, engine revolution number, shift information, etc.) or each warning display based on the vehicle information, its degree of impact on safety during traveling unless otherwise immediately notified to the driver.

Thus, the image integration control microcomputer 100 may determine the application information to be displayed on each display device, on the basis of this display priority and whether or not the application information is matched to the intended-use of the display device.

Furthermore, although, when the vehicle is traveling, the meter display information matched to the intended-use of the display device 20 is displayed in the normal display form (meter standard-screen 331), when the vehicle is not traveling (stopping), the meter display information may not be displayed, or a screen for making the meter display in the simplified display form may be applied while displaying the application information unmatched to the intended-use of the display device 20 in the normal display form. Namely, the image integration control microcomputer 100 generates when the vehicle is traveling, the display-screen data with a screen layout including a screen that displays the application information matched to the intended-use of the display device 20 in the normal display form, and generates when the vehicle is not traveling, the display-screen data with a screen layout not including the screen that displays the application information matched to the intended-use of the display device 20, or including a screen that displays said application information in the simplified display form as well as including a screen that displays the application information unmatched to the intended-use of the display device 20 in the normal display form.

When the vehicle is stopping and thus it is not necessary to present a meter display about a vehicle speed, etc. to the driver, a car-navigation operation screen is displayed on the display device 20 in the normal display form, for example. This allows the driver to perform a car navigation operation on the basis of the operation screen without looking away from the display device 20. Further, because the car navigation screen is displayed in the normal display form, operability is ensured also on the display device 20.

In this manner, even on the display device 20 with the intended-use related to the vehicle traveling condition, if the vehicle is not traveling, it is possible to display the application information other than that for the intended-use in a well-visible manner.

Figure 13:
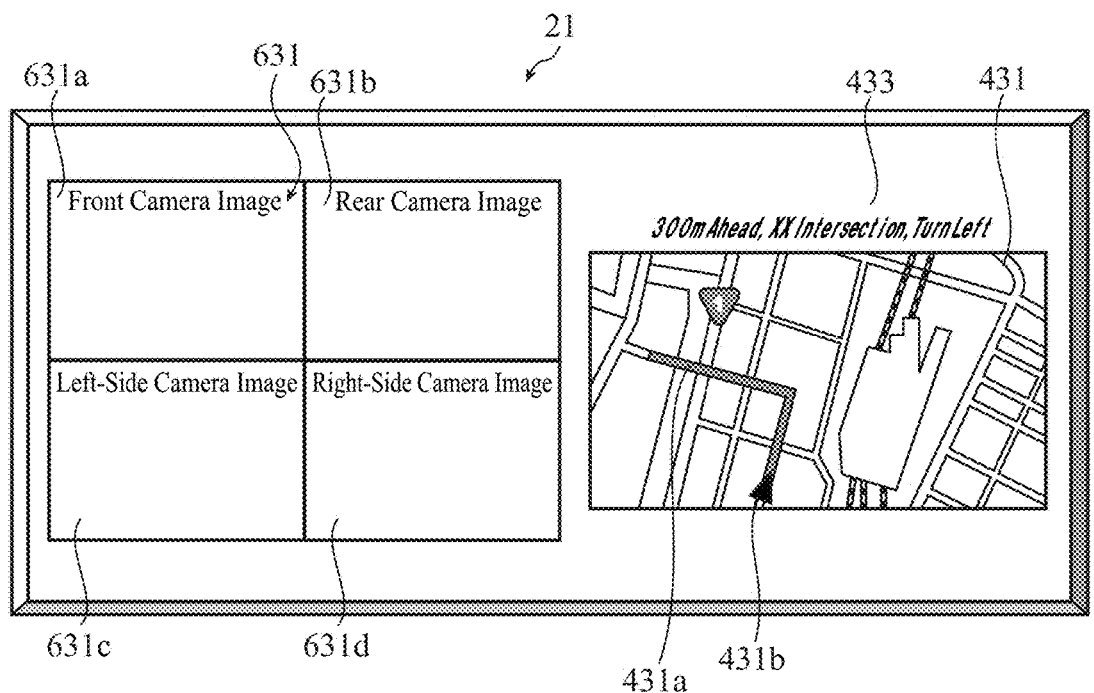
FIG. 13 is a diagram showing an example of a screen output of a display device placed at a center of the front side of a front seat.

FIG. 13 is a diagram showing an example of a screen output of the display device placed at the center of the front side of the front seat, in which shown is a case where a screen including a car navigation screen and a screen of capture images by in-vehicle sensors is displayed on the display device 21. The display screen in FIG. 13 is given with a layout in which the car-navigation standard-screen 431 shown in FIG. 3 and the sensor application standard-screen 631 shown in FIG. 5 are displayed side by side.

The display device 21 placed at the center of the front side of the front seat is a display device having the intended-use of presenting the car navigation information, the AV information and the vehicle periphery information. By thus configuring the screen layout, the fellow passenger on the assistant driver's seat can watch, on the display device 21, the capture images of the host-vehicle periphery in the normal display form while watching the route guide on the display screen of the map.

Figure 14:
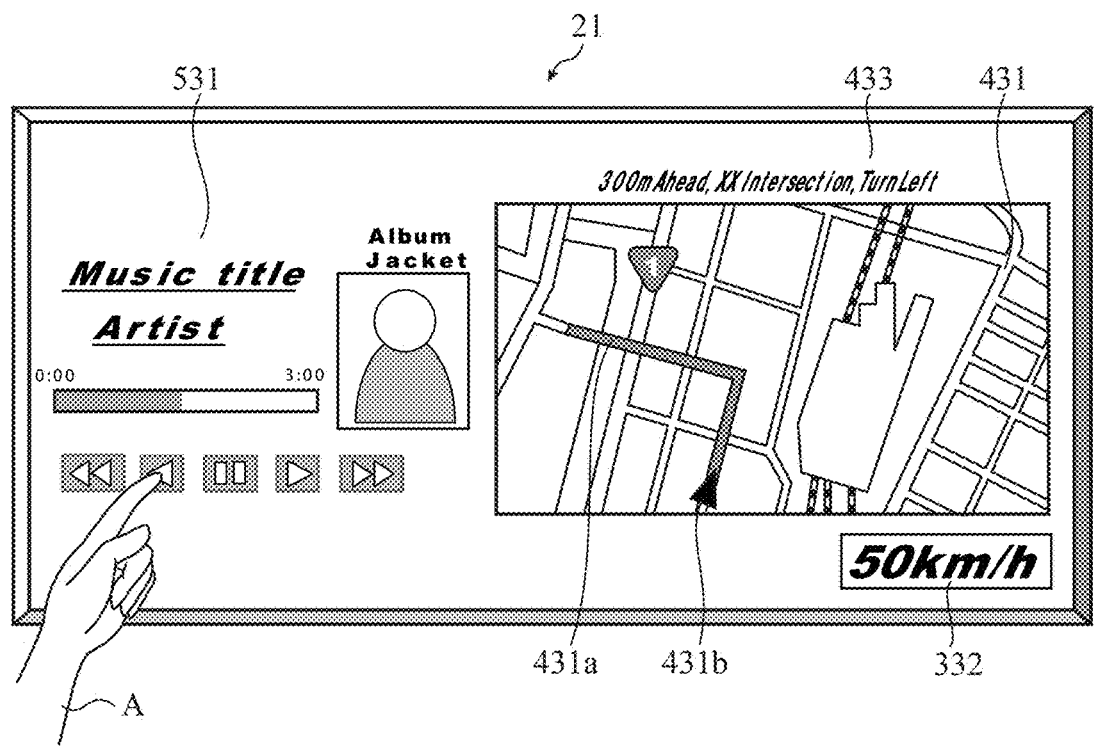
FIG. 14 is a diagram showing another example of a screen output of the display device placed at the center of the front side of the front seat.

FIG. 14 is a diagram showing an example of a screen output of the display device placed at the center of the front side of the front seat, in which shown is a case where a screen including the AV-playback screen, the car navigation screen and the vehicle-speed information screen is displayed on the display device 21. The display screen in FIG. 14 is given with a layout in which the meter application sub-screen 332 shown in FIG. 2, the car-navigation standard-screen 431 shown in FIG. 3 and the AV application standard-screen 531 shown in FIG. 4 are displayed. The fellow passenger on the assistant driver's seat can understand on the display device 21 placed at the center of the front side of the front seat, the situation of the host vehicle to be turned to the left at 300 meters ahead, from the guide route 431a on the map screen and the car-navigation sub-screen 433, and can further executes the AV-playback processing on the basis of the AV application standard-screen 531. In addition, based on the meter application sub-screen 332, the current vehicle speed can be watched.

When the fellow passenger on the assistant driver's seat is going to confirm the current vehicle speed of the host vehicle, it is easier to watch the vehicle speed when it is displayed on the display device 21 than when he/she looks deep into the display device 20 placed in the instrument panel.

In this case, the fellow passenger on the assistant driver's seat is not required to know a transition of the vehicle traveling condition in response to the driving operation by the driver, and is only required to confirm a value of the vehicle speed at that time. The display screen shown in FIG. 14 can meet such a need of the fellow passenger.

Meanwhile, description will be made about a case where the application information to be displayed on the display device 21 is determined among sets of application information matched to a plurality of the respective usages.

In this case, the image integration control microcomputer 100 may determine as the application information to be displayed, one selected by a user from a menu setup screen (a screen drawn by the image integration unit 10 itself) using the operation system.

Note that, other than by such a user setting as described above, the application information to be displayed on the display device 21 may be selected depending on a using state of the application, a gear position (for example, when the gear is in the back position, a rearward image is displayed), and/or a content of the application information (for example, when an obstruction is detected to exist in the periphery from the sensor-detected information (camera image), the sensor-detected information or the like is preferentially displayed).

Further, in the display control system according to Embodiment 1, when a touch panel is mounted on the screen of the display device shown in FIG. 14, it is possible to properly notify the corresponding application unit of its touch information.

As described previously, from the drawing state in the frame buffer memory of the display device 21, the image integration control microcomputer 100 manages as a display state on the display device 21, what position and what size each screen is displayed in on the screen of the display device 21 and what application unit generated the screen.

As shown in FIG. 14, when a user A makes a touch operation at the position of an operation button displayed in the AV application standard-screen 531, a touched coordinate position thereby is notified by the operation system 210 to the image integration control microcomputer 100 through the communication line 902.

The image integration control microcomputer 100 collates the display state on its managing display device 21 with the touched coordinate position notified from the operation system 210, to thereby determine that the screen subjected to the touch operation is the screen generated by the AV application unit 50. Thereafter, the image integration control microcomputer 100 notifies the AV application microcomputer 500 about the touched coordinate position and the screen-display information shown in FIG. 9 through the communication line 900.

Based on the touched coordinate position and the screen-display information notified from the image integration control microcomputer 100, the AV application microcomputer 500 determines what operation button is operated in the screen generated by its own graphic processor 510 followed by executing processing corresponding to the operation button of the determination result. In the case of FIG. 14, the audio being played back will be rewound.

Note that, with respect to a touch operation made in the car-navigation standard-screen 431 displayed on the display device 21, in a manner described above, the image integration control microcomputer 100 determines that a touch operation is made in the screen generated by the car-navigation application unit 40. In this case, the touched coordinate position and the screen-display information are notified to the car-navigation application microcomputer 400 but not notified to the AV application microcomputer 500.

As described above, according to Embodiment 1, it comprises: the image integration processor 110 that inputs the screen data in which the screens for displaying the sets of application information generated by the application units 30-60 in a normal display form are drawn, and the screen data in which the screens for displaying the sets of application information in a simplified display form are drawn, to thereby generate display-screen data for each display device, using the screen data in which the screens for displaying in the normal display form are drawn and the screen data in which the screens for displaying in the simplified display form are drawn; the display output controller 120 that outputs the display-screen data generated by the image integration processor 110 to the corresponding display device to be displayed thereon; and the image integration control microcomputer 100 that, among these screen data, selects for the application information matched to the intended-use of the display device, screen data in which the screen for displaying in the normal display form is drawn, and selects for the application information unmatched to the intended-use of the display device, screen data in which the screen for displaying in the simplified display form is drawn, followed by controlling based on these selected screen data to cause the image integration processor 110 to generate the display-screen data for said each display device. By providing such a configuration, it is possible to present the information in a display form well-suited to the target user watching each of the display devices 20, 21.

Alternatively, according to Embodiment 1, the image integration processor 110 inputs the screen data in which the screens for displaying the sets of application information generated by the application units 30-60 in the normal display form and the screens for displaying them in the simplified display form are both drawn, to thereby generate the display-screen data for each display device using the screen data; and among these screens drawn in the screen data, the image integration controller 100 selects for the application information matched to the intended-use of the display device, the screen for displaying in the normal display form, and selects for the application information unmatched to the intended-use of the display device, the screen for displaying in the simplified display form, followed by controlling to cause the image integration processor 110 to extract from the screen data, each screen data in which each of the selected screens is drawn and to generate based on the extracted screen data, the display-screen data for said each display device. This also makes it possible to present the information in a display form well-suited to the target user watching each of the display devices 20, 21.

Furthermore, according to Embodiment 1, the image integration control microcomputer 100 selects the screen data in which drawn is the screen of the application information specified by a user operation among the sets of application information unmatched to the intended-use of each of the display device 20, 21. This allows the information desired by the user to be displayed on his/her desired display device, thus making it possible to achieve improving the usability of the present system.

Furthermore, according to Embodiment 1, with respect to the display device 20 with the intended-use related to the vehicle traveling condition, the image integration control microcomputer 100 selects, when the vehicle is traveling, the screen data in which the screen for displaying the application information matched to the intended-use of the display device 20 in the normal display form is drawn; and when the vehicle is not traveling, does not select the screen data in which the screen for displaying the application information matched to the intended-use of the display device 20 in the normal display form is drawn, or selects the screen data in which the screen for displaying the application information matched to the intended-use of the display device 20 in the simplified display form is drawn and the screen data in which the screen for displaying the application information unmatched to the intended-use of the display device 20 in the normal display form is drawn. This allows, even on the display device 20 with the intended-use related to the vehicle traveling condition, the application information other than that for the intended-use to be displayed in a well-visible manner, if the vehicle is not traveling.

Furthermore, according to Embodiment 1, the application units 30-60 transmit to the image integration control microcomputer 100 screen-display information including, for every screen, a type indicative of its display form, a display position of the screen and a size of the screen, and the image integration control microcomputer 100 selects the screen data on the basis of the screen-display information. This makes it possible to properly perform extraction of the screen from the screen data.

Furthermore, according to Embodiment 1, the image integration control microcomputer 100 manages each display state of the selected screen data on the display device, and notifies each of the application units 30-60 about the display state of the screen data generated by said each of the application units 30-60. Thus, it is possible even in the application units 30-60 to recognize how the screens generated by themselves are displayed on the display devices 20, 21. For example, in the case where a touch panel is employed as the operation system of the display device 21, a size of the screen drawn by the application unit is different to a display size on the display device. Thus, with respect the screen size and the display position, the operation information of the touch panel is required to be converted. In this respect, notifying of the display state of the screen as described above, allows the operation information of the touch panel to be converted to the screen size and the display position handled by the application unit.

Furthermore, according to Embodiment 1, the image integration processor 110 generates the display-screen data by image-processing the screens of these screen data selected by the image integration control microcomputer 100, so that the screen layout can be provided properly using the extracted screens.

Furthermore, according to Embodiment 1, it is determined of what application unit the screen was touched, by collating among the screens making up the display-screen of each of the display devices 20, 21, the screen corresponding to a touch coordinate position in the touch panel provided on each of the display devices 20, 21, followed by transmitting the touch information to that application unit. This allows the touch information to be notified properly to the corresponding application unit.

Embodiment 2.

Figure 15:
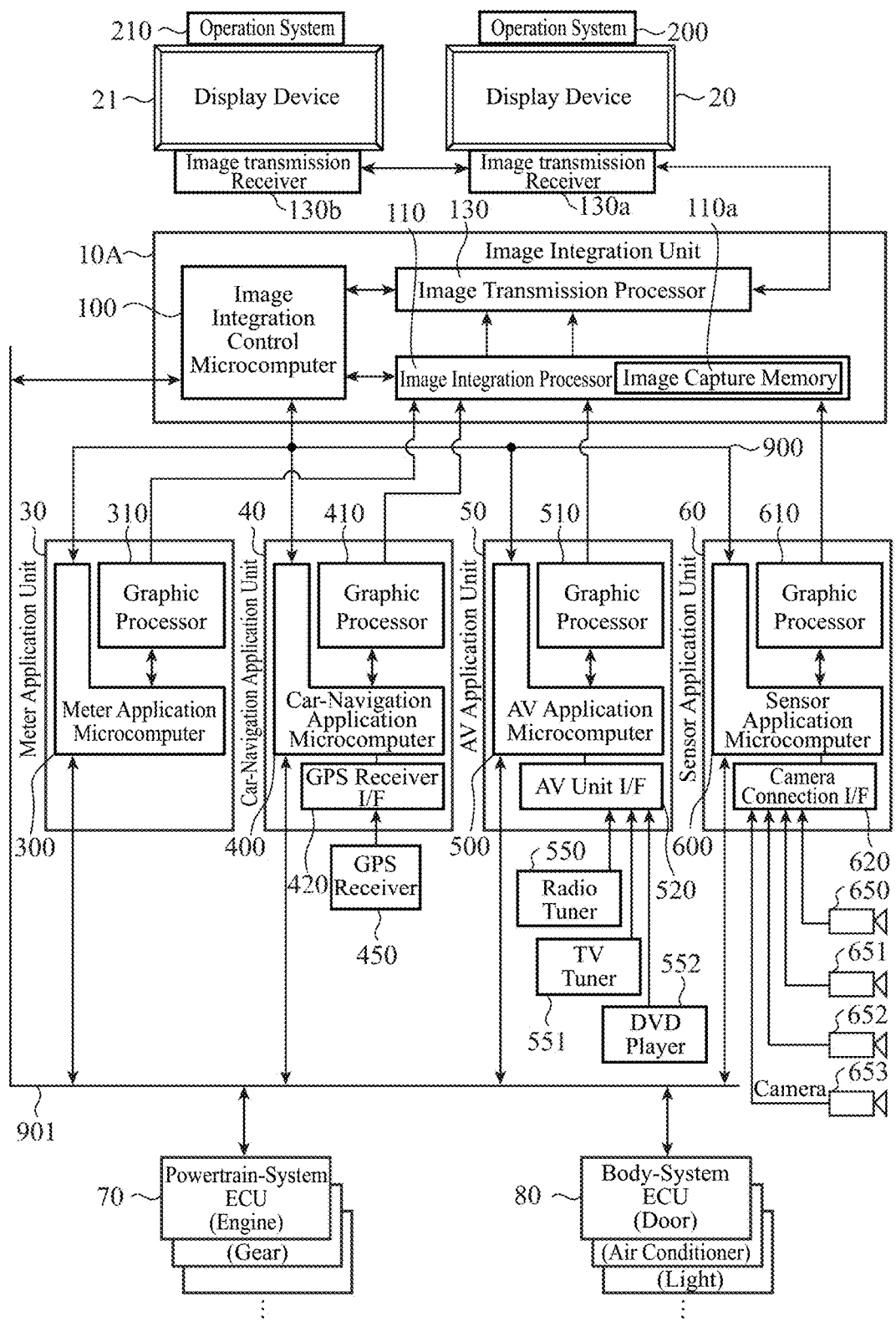
FIG. 15 is a block diagram showing a configuration of a display control system according to Embodiment 2 of the invention.

FIG. 15 is a block diagram showing a configuration of a display control system according to Embodiment 2 of the invention. As shown in FIG. 15, in the display control system according to Embodiment 2, an image integration unit 10A is configured with an image transmission processor 130 in place of the display output controller 120 shown in FIG. 1. The image transmission processor 130 is a display output driver that reads out the display-screen data for the display devices 20, 21 generated by the image integration processor 110, from the frame buffer areas on a single frame basis, and transmits them using high-speed serial communications to image transmission receivers 130a, 130b mounted in the display devices 20, 21. Further, the image transmission receivers 130a, 130b are each a transmission receiver that extracts to output the display-image data corresponding to its own display device from the serial communication signal received from the image transmission processor 130. Note that in FIG. 15, the same reference numerals are given for the same configuration elements in FIG. 1, so that description therefor is omitted here.

Figure 16:
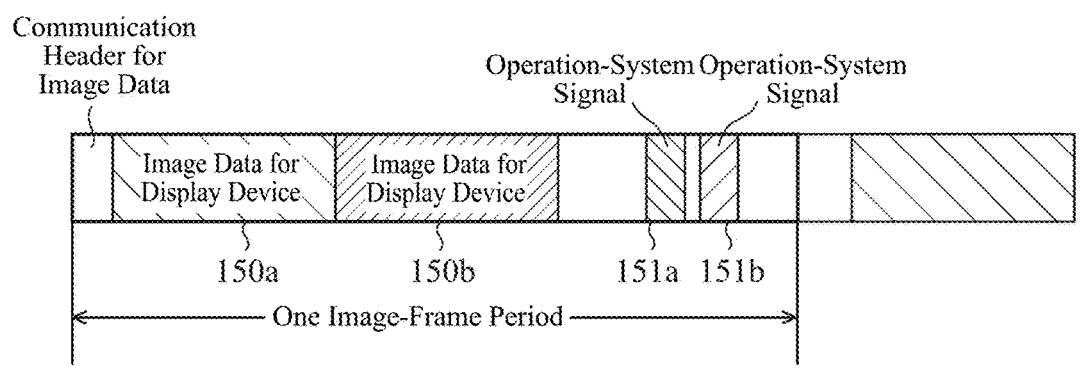
FIG. 16 is a diagram showing an example of a communication format of display-screen data transmitted from an image transmission processor to an image transmission receiver of each of display devices.

The image transmission processor 130 reads out the display-screen data for the display devices 20, 21 from the frame buffer areas on a single frame basis, converts them into communication packets as shown in FIG. 16, and then transmits them to the image transmission receivers 130a, 130b using high speed serial communications with a frequency range exceeding that of the all image signals.

From header information in the communication packet data shown in FIG. 16, the image transmission receivers 130a, 130b recognize them to be communication signals of image data, to thereby extract only packets of their corresponding image data 150a, 150b for display devices followed by outputting them to the display devices 20, 21 in conformity with the timing of the interface of each display device, to be displayed thereon.

Further, in the high-speed serial communications, a frequency range that permits signal transmission from the operation systems 200, 210 of the display devices 20, 21 to the image integration control microcomputer 100, is allocated in a time divisional manner to the image transmission receivers 130a, 130b so that they transmit, instead of the communication line 902 in FIG. 1, the operation information of the operation systems 200, 210 to the image integration control microcomputer 100.

In this case, the image integration control microcomputer 100 extracts from the data shown in FIG. 16, only packets of operation-system signals 151a, 151b indicative of the operation information of the operation systems 200, 210, followed by performing their corresponding processing. For example, it performs processing as described with FIG. 14, thus causing each application unit to execute the corresponding processing.

As described above, according to Embodiment 2, it includes the image transmission receivers 130a, 130b each provided to each of the display devices 20, 21 and extracting the display image data corresponding to its own display device from the received serial communication signal so as to output them, wherein the display transmission processor 130 makes serial communications with the image transmission receivers 130a, 130b and the image integration control microcomputer 100.

Even by providing such a configuration, it is possible to present the information in a display form well-suited to the target user watching each of the display device 20, 21. Further, with a simple communication configuration, it is possible to communicably connect between the image integration control microcomputer 100, the image transmission processor 130 and the image transmission receivers 130a, 130b.

It should be noted that unlimited combination of the respective embodiments, modification of any configuration element in the embodiments and omission of any configuration element in the embodiments maybe made in the present invention without departing from the scope of the invention.

INDUSTRIAL APPLICABILITY

The display control system having a plurality of display devices according to the invention can present information in a display form well-suited to the target user watching the display device, and thus, it is preferable as a display control system for in-vehicle use with a plurality of display devices mounted therein.

DESCRIPTION OF REFERENCE NUMERALS and SIGNS 10, 10A: image integration units,
20, 21: display devices,
30: meter application unit,
40: car-navigation application unit,
50: AV application unit,
60: sensor application unit,
70: powertrain-system ECU,
80: body-system ECU,
100: image integration control microcomputer,
110: image integration processor,
110a: image capture memory,
120: display output controller,
130: image transmission processor,
130a, 130b: image transmission receivers,
150a, 150b: image data for display devices,
151a, 151b: operation-system signals,
200, 210: operation systems,
300: meter application microcomputer,
310, 410, 510, 610: graphic processors,
330, 430, 530, 630: screen data,
331: meter standard-screen,
331a: speed meter display portion,
331b: tachometer display portion,
331c: gear display portion,
331d: travel distance display portion,
331e: fuel residual amount display portion,
331f: air conditioner display portion,
331g: winker display screen,
332: meter sub-screen,
333, 434, 534, 634: virtual screens,
431: car-navigation standard-screen,
431a: guide route,
431b: host-vehicle position mark,
432, 433: car-navigation sub-screens,
531: AV application standard-screen,
532, 533: AV application sub-screens,
631: sensor application standard-screen,
632, 633: sensor application sub-screens,
400: car-navigation application microcomputer,
420: GPS receiver interface (I/F),
450: GPS receiver,
500: AV application microcomputer,
520: AV unit interface (I/F),
550: radio tuner,
551: TV tuner,
552: DVD player,
600: sensor application microcomputer,
620: camera connection interface (I/F),
650-653: cameras,
900, 902: communication lines,
901: in-vehicle communication network.

The invention claimed is:

1. A display control system which displays screens of a plurality of application units on a plurality of display devices mounted in a moving object, each of the plurality of devices being associated with one or more of the plurality of application units on a basis of a particular use of each display device, comprising:

an image processor that receives application screen data from the plurality of application units, extracts, from the received application screen data, either first screen data for displaying application information in a normal display form or second screen data for displaying application information in a simplified display form, and generate display-screen data for each of the plurality of display devices, using the extracted first or second screen data;

a controller that determines, for each of the plurality of display devices, whether or not available application information received from each of the plurality of application units is to be displayed in a normal display form or a simplified display form based on whether or not each application unit is matched as being a particular use of the display device, where available application information received from an application unit matched with the display device is displayed in a normal display form and available application information received from an application unit unmatched with the display device is displayed in a simplified display form such that each display device has application information displayed in a normal display form and application information displayed in a simplified display form, and controls the image processor, based on the determination, to extract the first screen data for application information corresponding to a particular use of the respective display devices and to otherwise extract the second screen data; and a display output driver that outputs the display-screen data generated by the image processor to corresponding one of the display devices to be displayed thereon, wherein each of the plurality of application units includes a processor for performing a processing function and a display processor; and the processor of at least some application units having a processing function different from the processing function of the processor of another application unit.

2. The display control system of claim 1, wherein the controller selects the screen data in which the screen of the application information specified by a user operation among the sets of application information unmatched to the display device, is drawn.

3. The display control system of claim 1, wherein, with respect to the display device matched with an application unit related to a moving condition of the moving object, when the moving object is not moving, the controller determines that the application information from application unit related to the moving condition is displayed in the simplified display form for matched display devices, and is displayed in the normal display form for unmatched display devices.

4. The display control system of claim 1, wherein the plurality of application units each transmit to the controller, screen-display information including, for every screen, a type indicative of its display form, a display position of the screen and a size of the screen; and the controller selects the screen data on the basis of the screen-display information.

5. The display control system of claim 1, wherein the controller manages each display state of these selected screen data on the display device, and notifies the application unit about the display state of the screen data generated by that application unit.

6. The display control system of claim 1, wherein the image processor generates the display-screen data by image-processing the screens of these screen data selected. by the controller.

7. The display control system of claim 1, further comprising transmission receivers each provided to each of the display devices and extracting from a received serial communication signal, the display image data corresponding to said each of the display devices so as to output it to said each of the display devices, wherein the display output driver and the controller make serial communications with the transmission receivers.

8. The display control system of claim 1, wherein the controller determines of what application unit the screen was touched, by collating among the screens making up the display-screen of each of the display devices, the screen corresponding to a touch coordinate position in a touch panel provided on each of the display devices, to thereby transmit touch information to said application unit.

9. The display control system of claim 1, wherein the plurality of application units includes at least two application units of different types, the types being selected from a group consisting of a meter application unit, a car-navigation application unit, an AV application unit, and a camera image sensor application unit.

* * * * *